US006715367B1

(12) United States Patent
Gonzales et al.

(10) Patent No.: US 6,715,367 B1
(45) Date of Patent: Apr. 6, 2004

(54) UNIVER PLUS MASS AIR FLOW METER

(75) Inventors: James Gonzales, Redford, MI (US);
Gladwyn Wendell Cummins,
Plymouth, MI (US); William Edward Thomas, Lapeer, MI (US)

(73) Assignee: Best Products, Inc., Oak Park, MI (US)

( * ) Notice: Subject to any disclaimer, the term of this patent is extended or adjusted under 35 U.S.C. 154(b) by 0 days.

(21) Appl. No.: 10/282,339

(22) Filed: Oct. 18, 2002

(51) Int. Cl.$^7$ ................................. G01F 1/44
(52) U.S. Cl. ................. 73/861.63; 73/861.52; 73/861.64
(58) Field of Search ................. 73/861.65, 861.66, 73/861.63, 861.52, 861.64, 202

(56) References Cited

U.S. PATENT DOCUMENTS 5,048,327 A * 9/1991 Atwood ............... 73/118.2
5,127,173 A * 7/1992 Thurston et al. ........ 73/202
6,467,359 B1 * 10/2002 Atwood ............... 73/861.63

* cited by examiner

Primary Examiner—Edward Lefkowitz
Assistant Examiner—Corey D. Mack

(57) ABSTRACT

Improvement in a mass air flow meter having an elongated hollow body having a venturi member therein, the improvement comprising channels formed in the outside surface of the venturi member, lands defined by such outside surface which bear against the inside surface of the hollow body, such lands, together with the inside surface of the hollow body, directing the flow of sample air to be measured through such channels, around the outside surface of the venturi member and axially thereof, a first one of the channels being annular and in communication with the interior of the meter for receiving sample air therein, a second one of the channels serving as a measurement path in which the mass of sample air is measured as it travels therethrough, and a third one of the channels being annular and in which air exiting from the measurement path is accumulated before being recombined with the main flow of air traveling through the meter.

14 Claims, 11 Drawing Sheets

DIRECTION OF FLOW

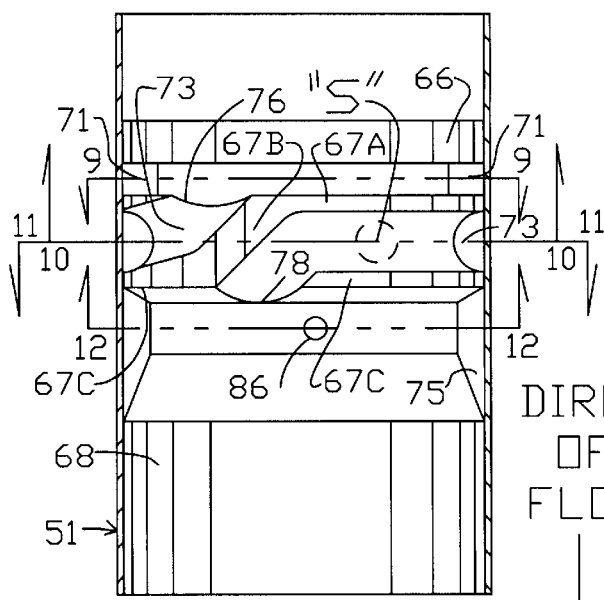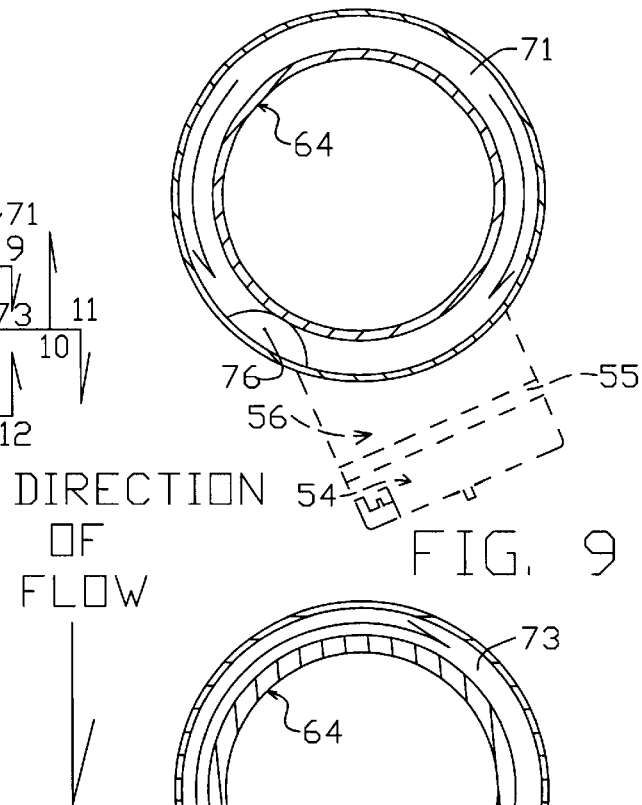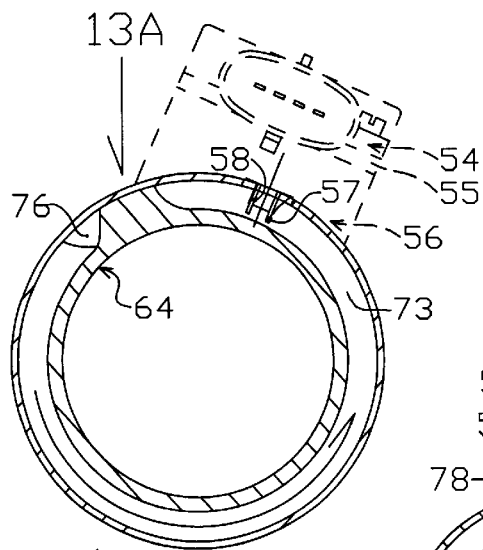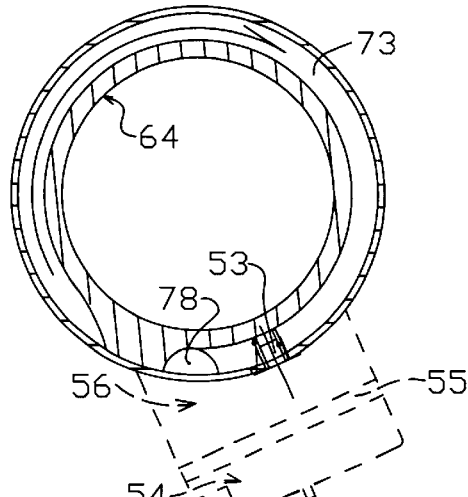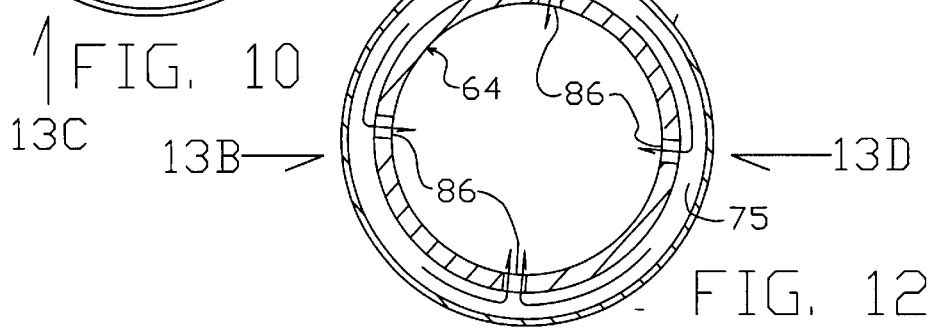

DIRECTION OF FLOW

DIRECTION OF FLOW

DIRECTION OF FLOW

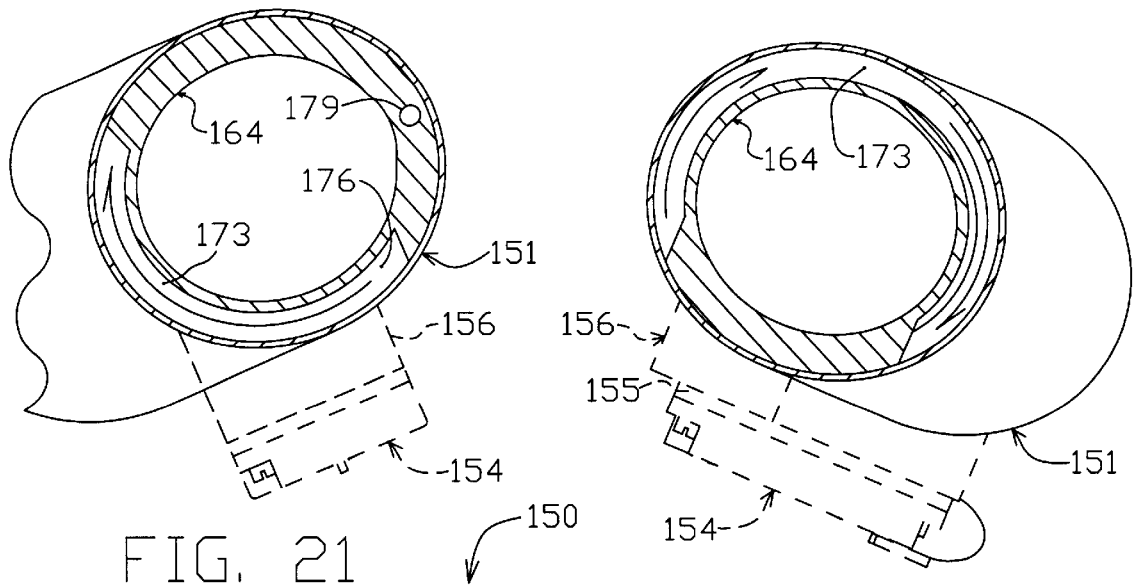
FIG. 21
FIG. 22
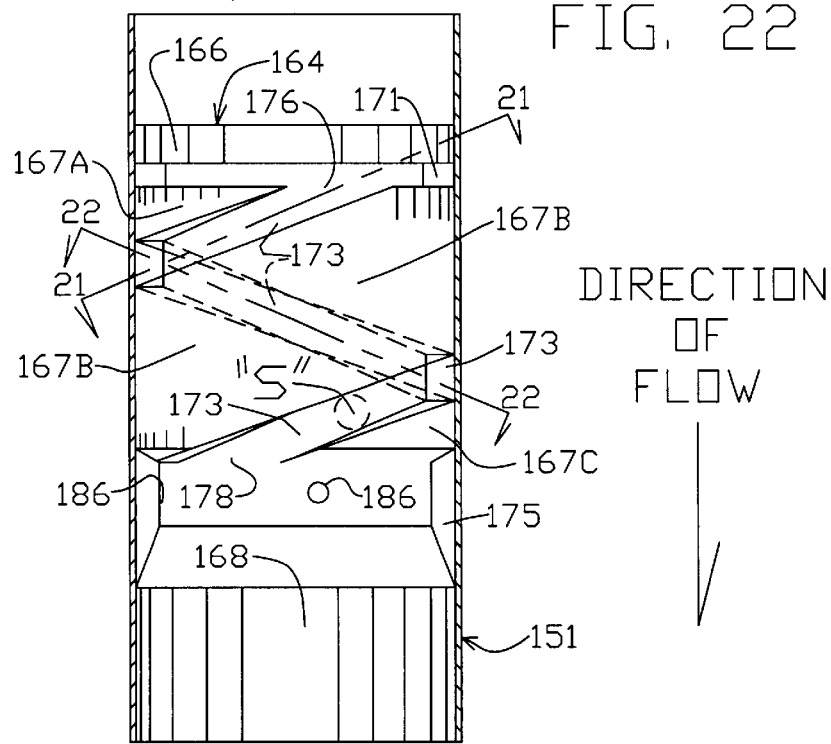
FIG. 19A

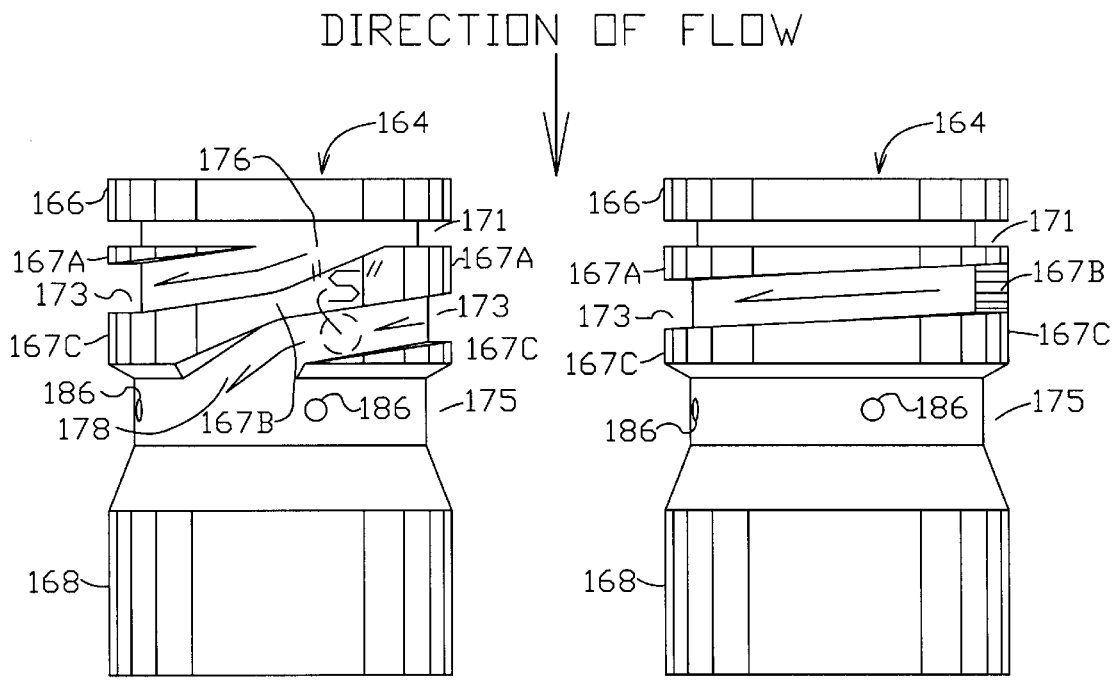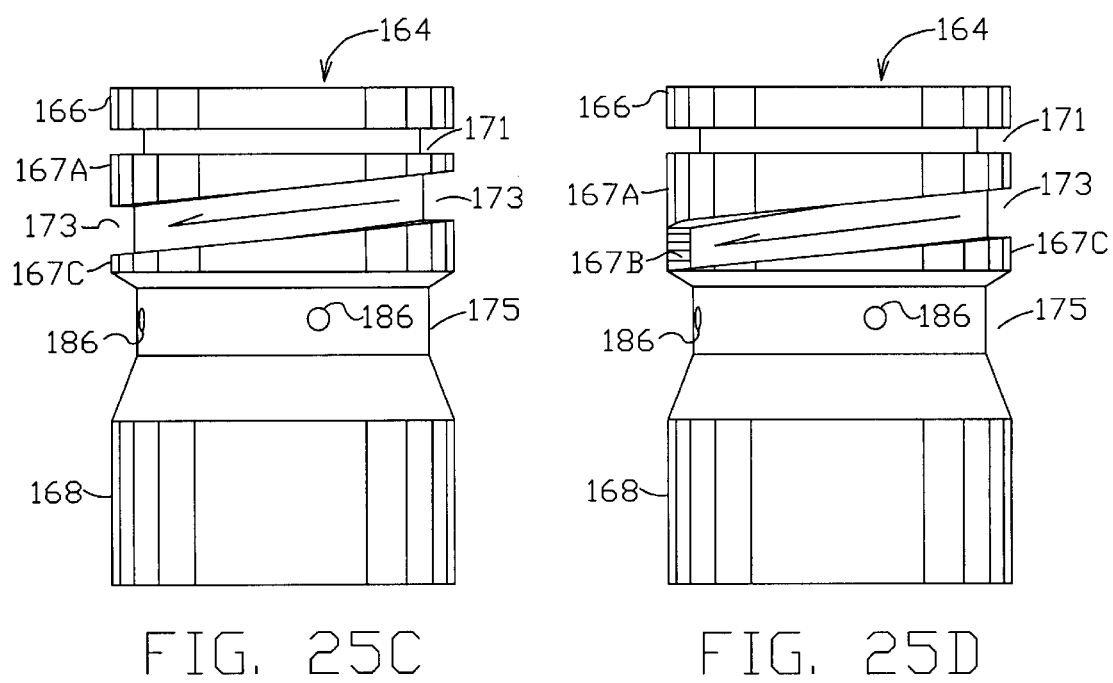
FIG. 25A  FIG. 25B  FIG. 25C  FIG. 25D

DIRECTION OF FLOW

UNIVER PLUS MASS AIR FLOW METER

Our invention relates to mass air flow meters of the type described in a pending patent application of Robert K. Atwood, Ser. No. 09/563,034 filed May 1, 2000 entitled "Improvements in a Mass Air Flow Meter" (referred to therein as the "UNIVER" mass air flow meter).

The principal object of our present invention is to provide an improved mass air flow meter having a lower manufacturing cost than the "UNIVER" meter and having improved accuracy while retaining the advantages of the latter.

BRIEF DESCRIPTION OF THE DRAWINGS

The foregoing object of our invention and the advantages thereof will become apparent during the course of the following description, taken in conjunction with the accompanying drawings in which a first embodiment of our invention is shown in FIGS. 1–13D, a second embodiment in FIGS. 14–25D, and a third embodiment in FIGS. 26–27.

First Embodiment Shown

FIGS. 8–12 are views of said mass airflow meter in a position rotated (for clarity of illustration) from that shown for it in FIGS. 1–7; the amount of rotation being about 25 degrees as can be seen by comparing the position of the electrically insulated housing 54 in FIGS. 9–12 with the same component in FIGS. 3 and 4;

FIG. 8 is a horizontal sectional view of the meter so rotated with the venturi member shown in plan (and not sectioned); shading for some surfaces has been omitted for clarity of illustration;

FIGS. 9–12 are different vertical sectional views of the structure of FIG. 8 taken, respectively, on the lines 9—9, 10—10, 11—11 and 12—12 thereof;

FIG. 13A is a top plan view of the venturi member as viewed in the direction of the arrow "13A" in FIG. 10;

FIG. 13B is a left side elevational view of the venturi member as viewed in the direction of the arrow "13B" in FIG. 12;

FIG. 13C is a bottom plan view of the venturi member as viewed in the direction of the arrow "13C" in FIG. 10;

FIG. 13D is a right side elevational view of the venturi member as viewed in the direction of the arrow "13D" in FIG. 12.

Second Embodiment Shown

Figure 15:
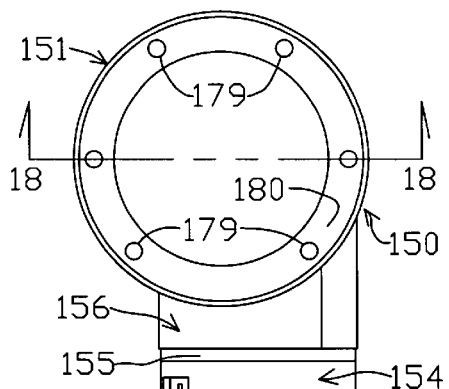
Figure 17:
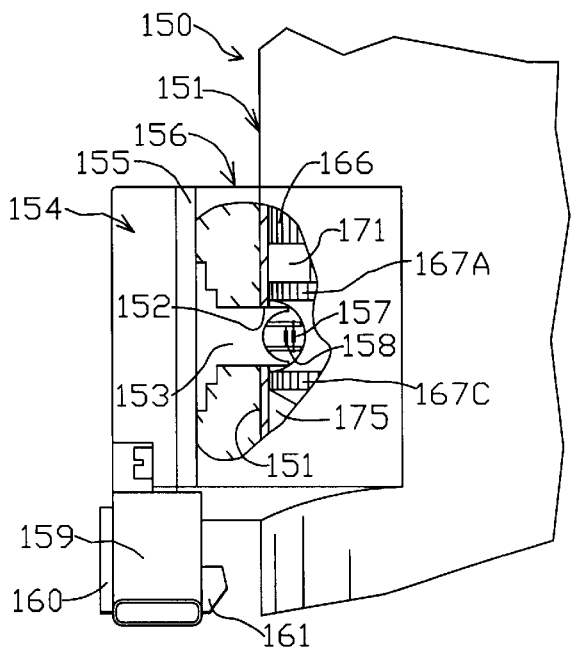
Figure 14:
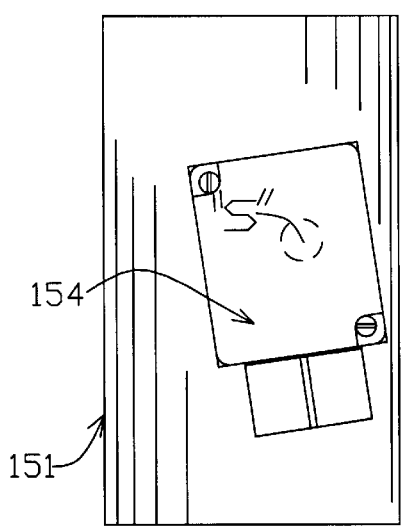
Figure 16:
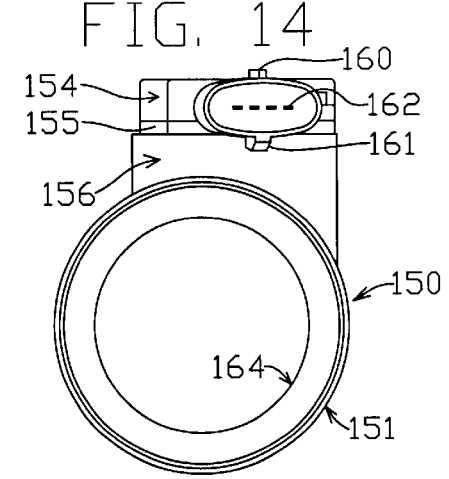
Figure 18:
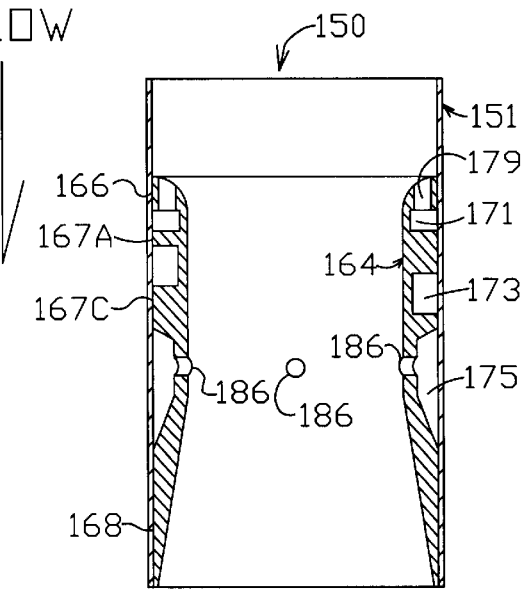
Figure 20:
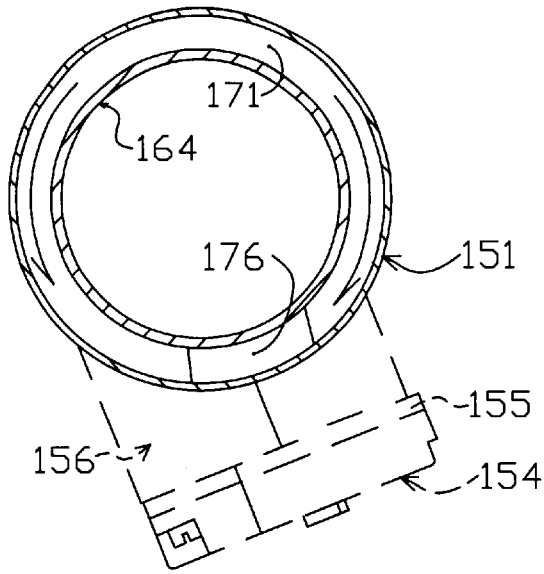
Figure 19:
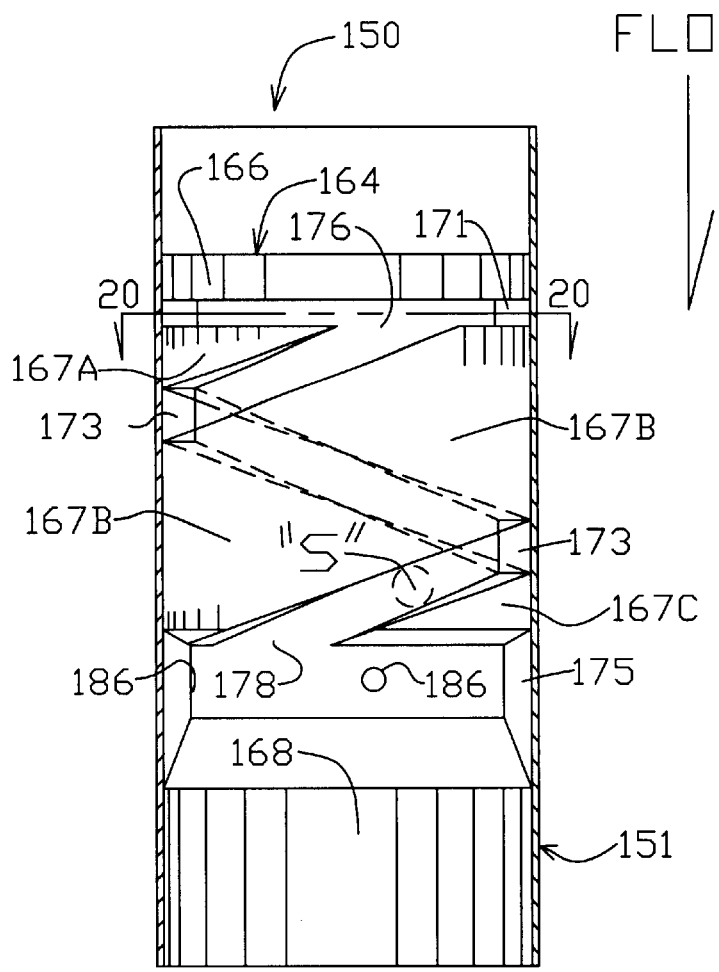
Figure 19B:
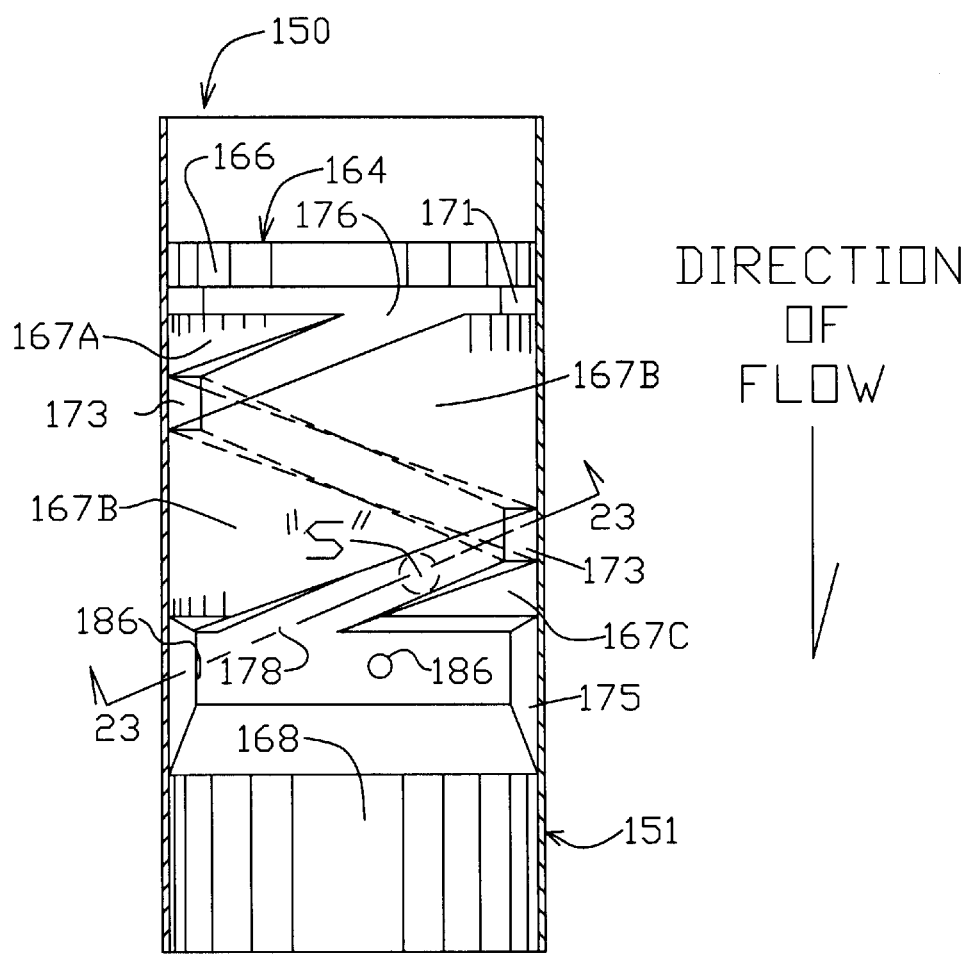
Figure 23:
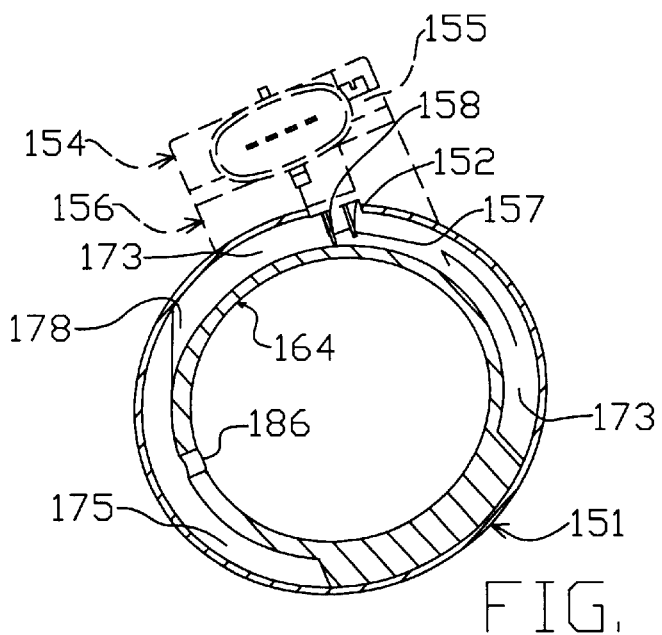
Figure 19C:
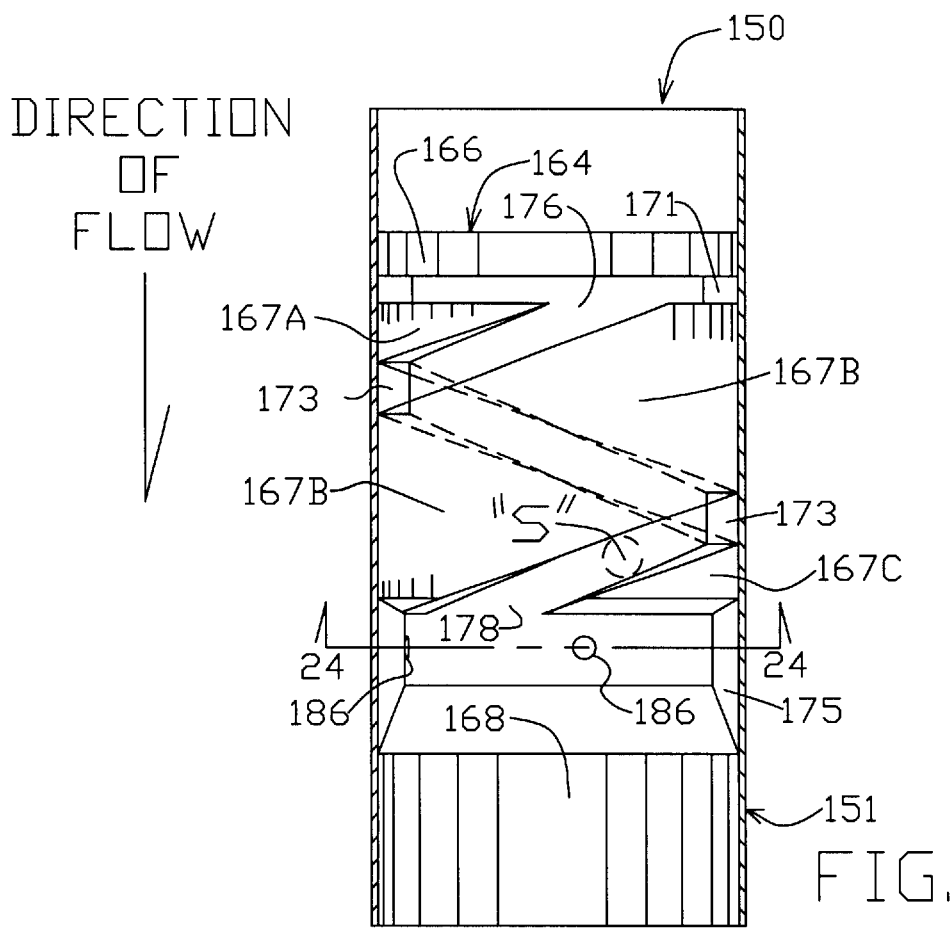
Figure 24:
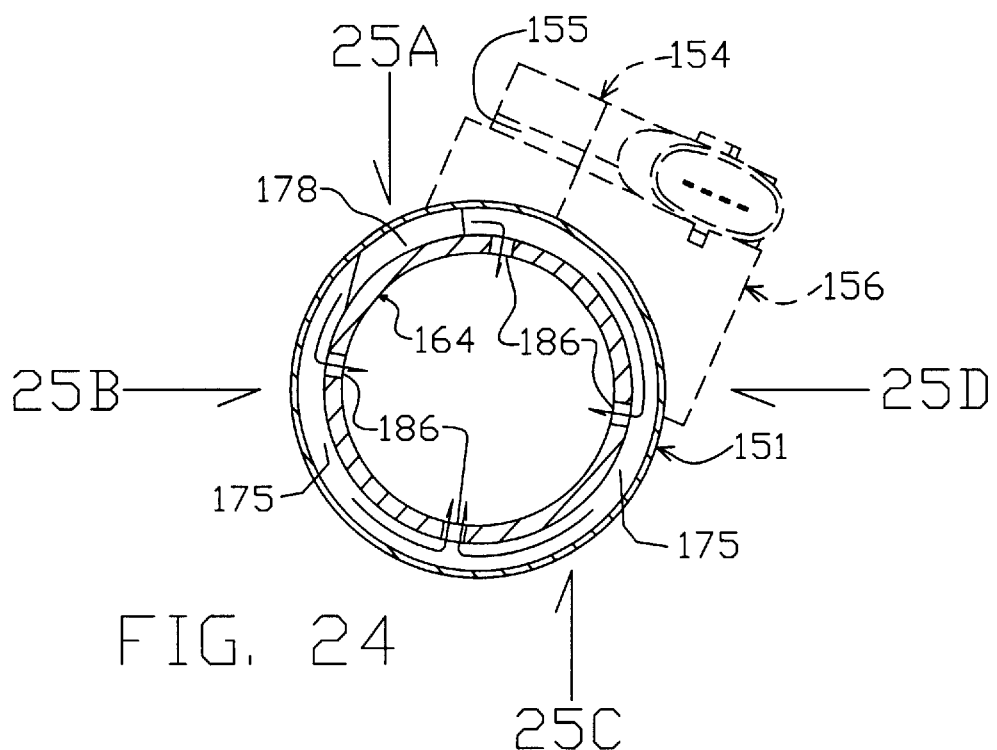

FIG. 14 is a top plan view of another mass air flow meter embodying our invention; same being viewed from above an engine compartment of a motor vehicle while looking back to front thereof;

FIG. 15 is a front elevational view of the entrance end thereof;

FIG. 16 is a rear elevational view of the exit end thereof;

FIG. 17 is a fragmentary right side elevational view of the structure of FIG. 14 (with parts removed for clarity of illustration);

FIG. 18 is a horizontal sectional view of the structure of FIG. 15 taken on the line 18—18 thereof;

FIGS. 19–24 are different views of said other embodiment in a position rotated (for clarity of illustration) from that shown for it in FIGS. 14–18; the amount of rotation being about 25 degrees as can be seen by comparing the position of the electrically insulated housing 154 in FIGS. 20–24 with the same component in FIGS. 15 and 16;

FIG. 19 is a central horizontal sectional view of said other embodiment in such rotated position; the venturi member is shown in plan (and not sectioned); a portion thereof is illustrated as being artificially "stretched" axially for clarity of illustration; the portion "stretched" is the flow path for measurement which extends axially between the section line 20—20 (FIG. 19) and the section line 24—24 (FIG. 19C);

FIGS. 19A–19C are each identical to FIG. 19, but are shown separately and differently numbered for the purpose of taking different vertical sectional views therefrom;

FIG. 20 is a vertical sectional view of the structure of FIG. 19 taken on the line 20—20 thereof;

FIGS. 21–22 are vertical sectional views of the structure of FIG. 19A taken, respectively, on the lines 21—21 and 22—22 thereof;

FIG. 23 is a vertical sectional view of the structure of FIG. 19B taken on the line 23—23 thereof;

FIG. 24 is a vertical sectional view of the structure of FIG. 19C taken on the line 24—24 thereof;

FIGS. 25A–25D are different views of the venturi member of said other embodiment so rotated (about 25 degrees) and shown by itself (and not "stretched"); shading for some surfaces has been omitted for clarity of illustration;

FIG. 25A is a top plan view of the venturi member of said other embodiment as viewed in the direction of the arrow "25A" in FIG. 24;

FIG. 25B is a left side elevational view of the venturi member of said other embodiment as viewed in the direction of the arrow "25B" in FIG. 24;

FIG. 25C is a bottom plan view of the venturi member of said other embodiment as viewed in the direction of the arrow "25C" in FIG. 24; and FIG. 25D is a right side elevational view of the venturi member of said other embodiment as viewed in the direction of the arrow "25D" in FIG. 24.

Third Embodiment Shown

Figure 28:
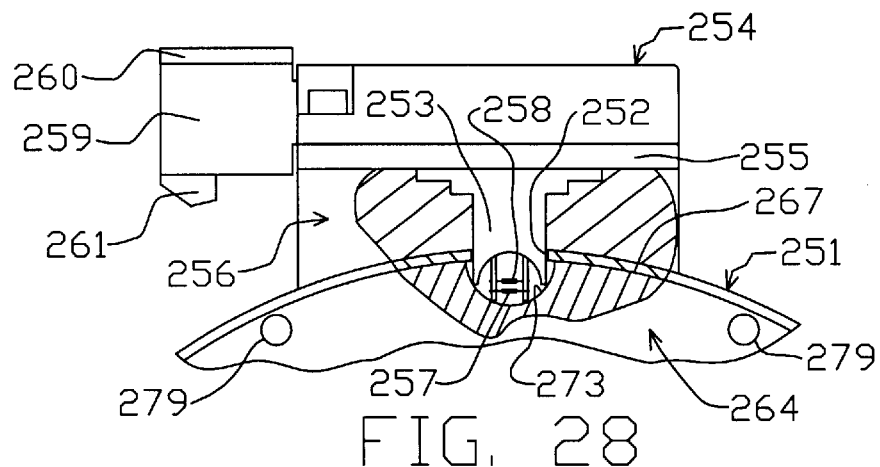
Figure 27:
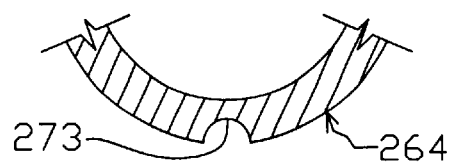
Figure 26:
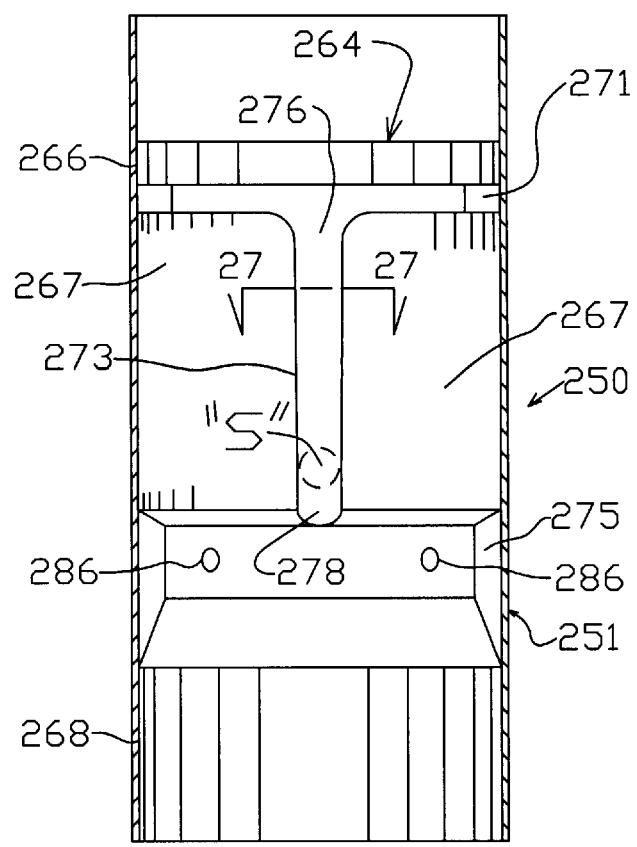

FIG. 26 is a horizontal sectional view of the meter with the venturi member shown in plan (and not sectioned); shading for some surfaces has been omitted for clarity of illustration;

FIG. 27 is a vertical sectional view of a portion of the structure of FIG. 26 taken on the line 27—27 thereof; and FIG. 28 is a fragmentary front elevational view thereof with parts in section.

DETAILED DESCRIPTION OF THE FIRST EMBODIMENT

Referring to the drawings in greater detail, and first to FIGS. 1–13, reference numeral 50 generally designates the improved mass air flow meter shown therein. Said meter 50 comprises a hollow body 51 which is cylindrical in form, in the instance. The hollow body 51 is provided with an aperture 52 therein (FIGS. 2 and 5) extending through the wall thickness thereof for receiving the protruding end 53 of an air flow transducer. Said air flow transducer, a signal amplifier and other electronic components (not shown) are contained in an electrically insulated housing 54 having a metal base 55 which is made fast to a saddle block 56 which, in turn, is made fast to the outside wall of the hollow body 51.

Figure 1:
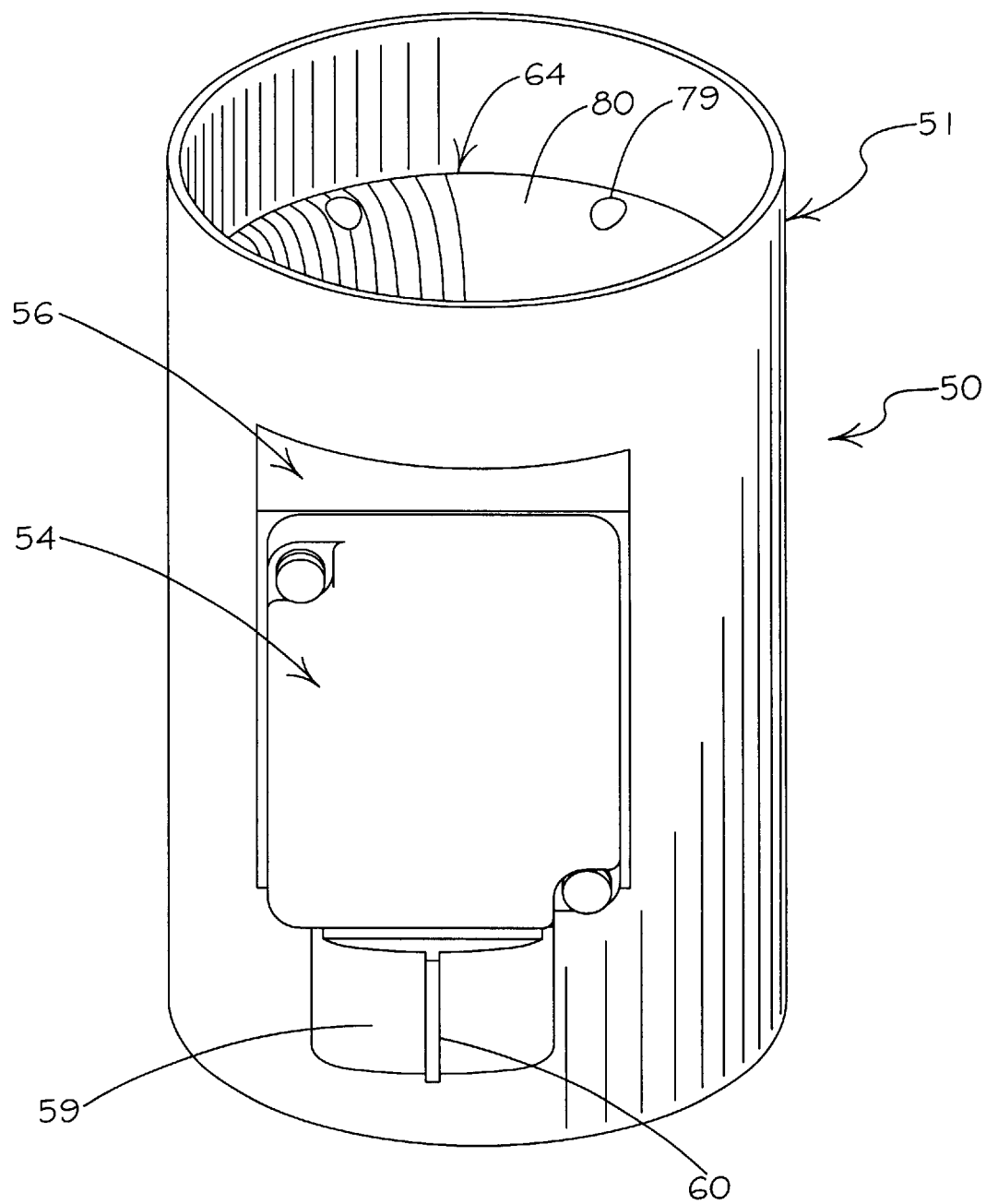
FIG. 1 is a perspective view of a mass air flow meter embodying our invention.
Figure 3:
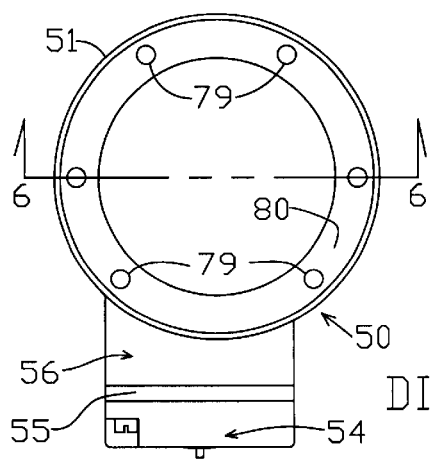
FIG. 3 is a front elevational view of the entrance end of said meter.
Figure 2:
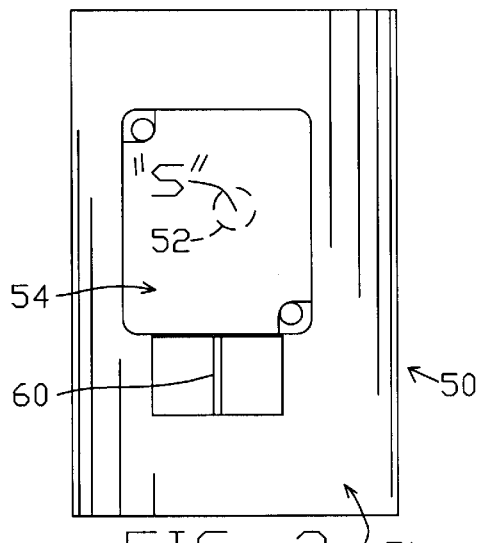
FIG. 2 is a top plan view thereof viewed from above an engine compartment of a motor vehicle while looking back to front thereof.
Figure 4:
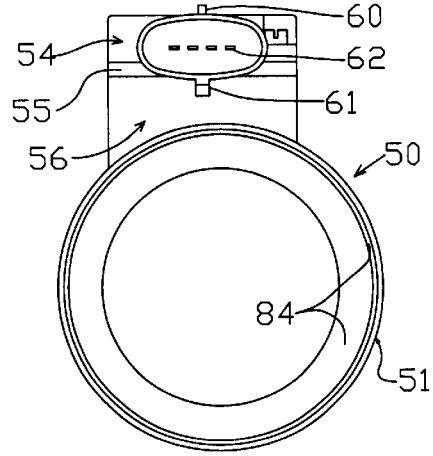
FIG. 4 is a rear elevational view of the exit end thereof.
Figure 5:
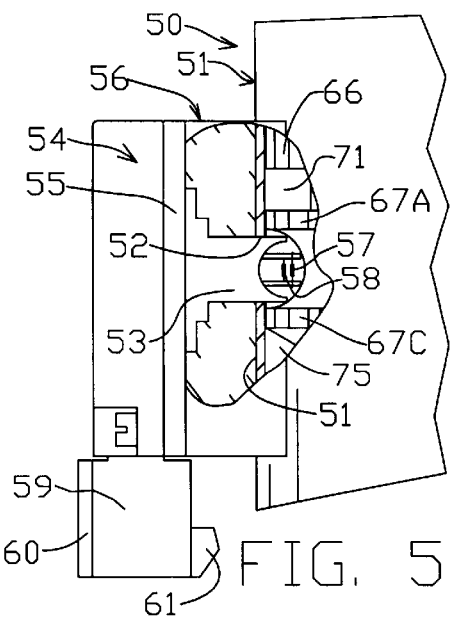
FIG. 5 is a fragmentary right side elevational view of a portion of the structure of FIG. 2 (with parts removed for clarity of illustration)
Figure 6:
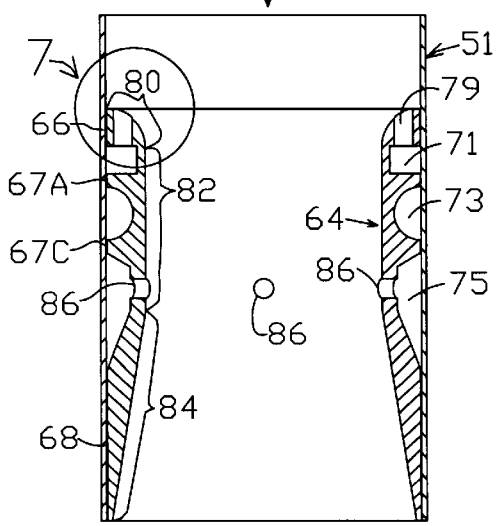
FIG. 6 is a horizontal sectional view of the structure of FIG. 3 taken on the line 6—6 thereof.
Figure 7:
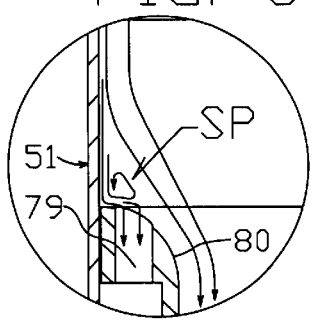
FIG. 7 is an enlarged view of a portion of the structure of FIG. 6 as indicated by the arrow "7" thereon.

The protruding end 53 carries sensing elements 57 and 58 which extend into the measuring flow path for measuring the mass of air traveling therethrough (FIGS. 2 and 5). As is well known, one such element is an ambient temperature sensor and the other is an air flow sensor. In the drawings, the reference letter "S" is used to indicate where the measurement of the mass of sample air occurs (i.e., at the location of said protrudng end 53 carrying the sensing elements 57 and 58) were all parts of the meter (50 and 150, respectively) shown.

An electrical connector 59 having both a locator key 60 and a lock 61 formed thereon projects from the rear of the housing 54. The rear end of said connector 59 has a cavity formed therein in which connector pins 62 are located for supplying electrical power for the various electronic elements (not shown) contained in said housing 54. In the instance, four such pins 62 are shown; sometimes six pins are employed depending upon the particular circuitry being used to generate the mass air flow (MAF) signal-out.

The mass air flow meter 50 includes a venturi member 64 having a venturi therein. Said venturi member 64 has channels formed in the outside surface thereof. Lands are defined by such outside surface of the venturi member 64 which bear against the inside surface of the hollow body 51. Said lands, together with the inside surface of the body 51, direct sample air to be measured through said channels, around the outside surface of the venturi member 64 and axially thereof. There are two end lands at opposite ends of the venturi member which are continuous, of uniform axial length and made air tight at their outside surfaces to the inside surface of the hollow body 51 by suitable means (not shown), as by O-rings in the embodiment shown. The end land at the entrance of the venturi member 64 is designated 66 while that at the exit end thereof is designated 68. Between said end lands 66 and 68, is a middle land which is discontinuous, of non-uniform axial length and made substantially air tight to such inside surface of the body 51 by suitable means (not shown), as by a press fit. In the space between the entrance end land 66 and the middle land is a first channel 71. The middle land has three sections, 67A, 67B, and 67C, which define the path of air flow in a second channel 73 to provide a measurement path for sample air. In the space between the middle land section 67C and the exit end land 68 is a third channel 75. The sections 67A and 67C are axially spaced apart while the section 67b extends across the channel 73 (both circumferentially and axially) and bridges the sections 67A and 67C.

An entrance gap 76 for the channel 73 is formed adjacent a free edge of the section 67A and an exit gap 78 therefor is formed adjacent a free edge of the section 67C. The first channel 71, which is annular over its length, serves as a static pressure manifold for the mass air flow meter 50 by receiving sample air flowing thereinto from inlet aperture means 79 and accumulates same while circulating therearound. In the instance, said aperture means 79 is in the form of a plurality of circumferentially spaced apart apertures which open to the main flow of air entering the meter 50. The latter extend through the wall thickness of the venturi member 64 at the entrance end thereof. In the instance, the axes of the apertures 79 are parallel to the longitudinal axis of the meter 50.

The venturi member 64 is formed at its entrance with a nozzle type end 80 which, with the inside wall of the hollow body 51, causes a severely abrupt change of direction of incoming air to occur at the annular boundary therebetween (between said inside surface of the hollow body 51 and said nozzle type end 80). This abrupt change in direction (substantially 90 degrees) causes, in turn, an annular stagnation flow "SF" (FIG. 7) to develop at said annular boundary so that different static pressures of the kinematic flow of the air entering the meter 50 (and traveling toward the venturi throat) can be sensed at the apertures 79.

The inside surface of the venturi member is formed with a convergent entry section consisting of said nozzle type end 80, a throat section 82 forming a venturi and a convergent recovery section 84. The throat section 82 extends downstream from the nozzle type end 80 to just past a plurality of circumferentially spaced apart outlet aperture means 86 referred to further on in greater detail.

Figures 13A, 13B:
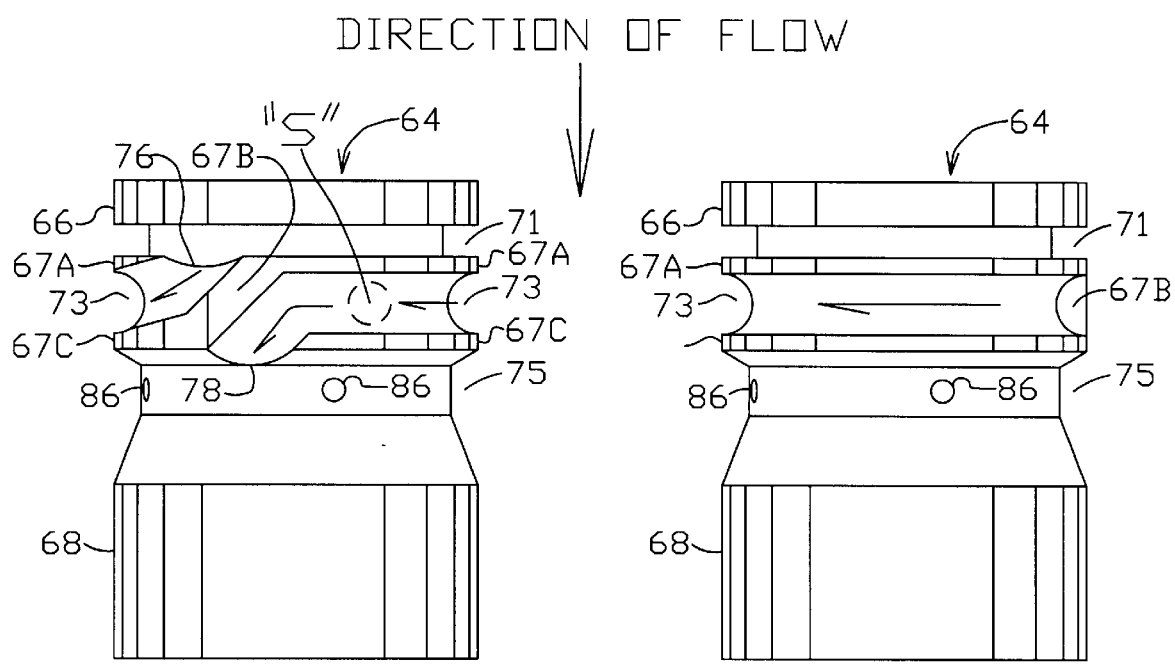
FIGS. 13A–13D are different views of the venturi member so rotated (about 25 degrees) and shown by itself.
Figures 13C, 13D:
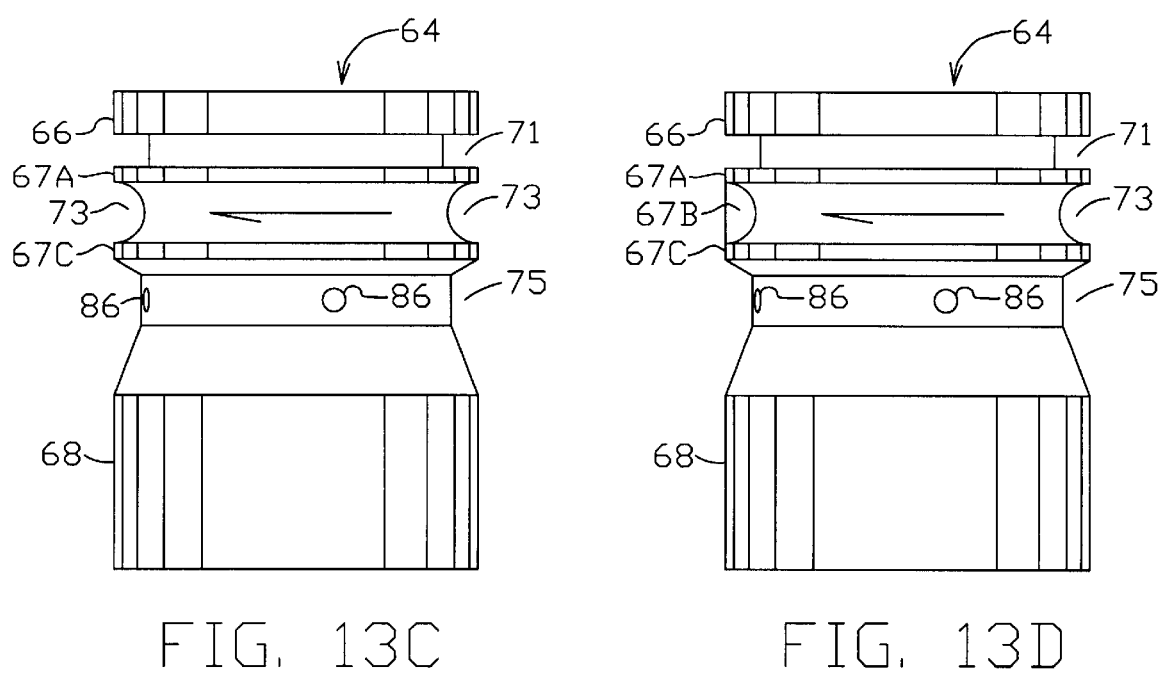

The second channel 73 formed by and within the three sections of the middle land provides a flow path for measuring the mass of sample air flowing therethrough. As shown, the channel 73, which, in the instance, is annular over its length, is substantially cylindrical along the axis of flow therein. The actual measurement of the mass of sample air occurs at that point of flow indicated by the reference letter "S" corresponding to the loation of the mass air flow sensors 57 and 58. As can be seen, this is at the downstream end of the channel 73 safely upstream from the exit gap 78 (FIGS. 8 and 13A). In this way, the location "S" is at the longest distance from the entrance gap 76 which enables the flow of sample air to become most laminar for greater accuracy of measurement. Preferably, the channel 73 is made to decrease in cross-section as it extends over its length from the entrance gap 76 to the location "S" where the measurement of the mass of sample air occurs. The cross-sectional shape of the channel 73 is substantially semi-circular, in the instance shown (FIGS. 6, 8 and 13A through 13D), but can be partly rectangular and partly semi-circular depending upon which shape produces the best laminar air flow at the location "S" where the measurement of the mass of sample air occurs.

The third channel 75, which is annular over its length, serves as a collection chamber for the mass air flow meter 50 by receiving sample air flowing thereinto from the measurement path 73, via exit gap 78, and accumulates same while circulating therearound. Said channel 75 is provided with the aforementioned outlet aperture means 86 which extend through the wall thickness of the venturi member 64 at the throat thereof. In the instance, said aperture means 86 is in the form of a plurality of circumferentially spaced apart apertures which open to the main flow of air as it passes the throat of the venturi member 64. In the instance, the axes of the apertures 86 are perpendicular to the longitudinal axis of the meter 50. The air exiting from the collection chamber 75, via outlet aperture means 86,recombines with the main flow of air traveling through the meter 50.

In operation of the meter 50, the direction of the main air flow therethrough is as indicated by the arrow (and accompanying legend) in FIGS. 2 and 8. The meter 50 is usually located downstream from an air filter, super-charger, turbocharger or the like. Such main air flow enters the entrance end of the meter 50 and travels past the venturi throat and out the exit end thereof, through the throttle body and into the intake manifold of an internal combustion engine. While such main air flow travels through the meter 50, a portion thereof enters, via aperture means 79, the first channel or static pressure manifold 71 and accumulates therein while flowing therearound (in two directions). Air exiting from the static pressure manifold 71, via inlet gap 76, enters the second channel or measurement path 73 and flows therethrough (in one direction) where its mass is-measured by sensors 57 and 58 at the location "S", as mentioned. Air exiting from the measurement path 73, via exit gap 78, enters the third channel or collection chamber 75 and accumulates therein while flowing therearound (in two directions). The vacuum created inside the venturi member 64 from the main flow of air speeding up at the throat thereof thereof draws the air accumulated in the collection chamber 75 out of the aperture means 86 where it is recombined with such main air flow traveling through the meter 50. As is well known in the art, the instantaneous measurements of the mass of air traveling through the measurement path are used to develop an output signal MAF) which controls the injection of fuel into said engine. The meter 50 can be used for stationary internal combustion engines (diesel or gasoline powered), for testing purposes and other applications where fluid flow measurement is required or needed.

DETAILED DESCRIPTION OF THE SECOND EMBODIMENT

Referring now to FIGS. 14–25D, reference numeral 150 generally designates the improved mass air flow meter shown therein. Said meter 150 is constructed substantially the same as the first embodiment so that comparable elements are similarly designated with reference numbers in the "100" series. Sections 167A, 167B and 167C of the middle land and the second channel 173 defining the measurement path are constructed so as to provide a helical path for the flow of sample air therein. As shown in FIG. 25A, the bridge 167B has less extension axially then the bridge 67A due to the measurement path 173 being helical over its length. For the same reason (because the measurement path 173 is helical over its length), the housing 154 for the electronics components (which function in conjunction with the sensing elements 157 and 158) is disposed askew to the longitudinal axis of the meter 150 as shown in FIG. 14. The cross-sectional shape of the channel 173 is substantially rectangular, in the instance shown, but can be partly semi-circular and partly rectangular depending upon which shape produces the best laminar air flow at the location "S" where the measurement of the mass of sample air occurs. Preferably, the channel 73 is made to decrease in cross-section as it extends over its length from the entrance gap 76 to the location "S" where the measurement of the mass of sample air occurs.

For a given axial length of meter, the helical measurement path makes the meter 150 more accurate than the meter 50 because it provides a longer measurement path which allows the flow of sample air to become more laminar before reaching the location "S". Save for the measurement path 173 being helical over its length, the meter 150 operates substantially the same as does the meter 50.

A COMPARISON TEST

Tests were conducted under identical conditions to compare the accuracy of the meter 150 with that of the aforementioned Atwood "UNIVER" meter. A part of the results thereof were made to visually appear on a monitor. A fluctuating line representing the output (MAF) signal generated by each meter was observed; that from the meter 150 was of lower amplitude throughout. This was taken to mean greater clarity of output signal from the meter 150 and hence greater accuracy. In addition to such observations, recorded test data substantiate the differences in amplitudes of the respective output signals and hence of the greater accuracy of the meter 150.

DETAILED DESCRIPTION OF THE THIRD EMBODIMENT

Referring now to FIGS. 26–28, reference numeral 250 generally designates the improved mass air flow meter shown therein. Said meter 250 is constructed substantially the same as the prior embodiments so that comparable elements are similarly designated with reference numbers in the "200" series. The middle land is constructed without distinct sections and is designated 267 for that reason. Such middle land 267 and the second channel 273 defining the measurement path are constructed so as to provide a substantially straight measurement path for the flow of sample air therein which measurement path extends axially of the meter 250 parallel to its centerline. Preferably, the cross-section of the measurement path 273 decreases as it extends over its length from the inlet gap 76 to the location "S" where the measurement of the mass of sample air occurs. The cross-sectional shape of the channel 273 is substantially semi-circular, in the instance shown, but can be partly rectangular and partly semi-circular depending upon which shape produces the best laminar air flow at the location "S" where the measurement of the mass of sample air occurs. The meter 250 can be elongated so that the measurement path 273 will have the same length as that for the meters 50 or 150.

Save for the measurement path 273 being straight over its length, the meter 250 operates substantially the same as do the meters 50 and 150.

The trademark "UNIVER PLUS" is intended to be used for the new low cost meter herein disclosed.

What is claimed is:

1. Improvement in a mass air flow meter having an elongated hollow body having a venturi member therein, said venturi member having a venturi formed in the inside surface thereof, said meter having a static pressure chamber, a measurement path and a collection chamber, said improvement comprising channels formed in the outside surface of said venturi member, lands defined by said outside surface which bear against the inside surface of said hollow body, said lands, together with the inside surface of said hollow body, directing the flow of sample air to be measured through said channels, around the outside surface of the venturi member and axially thereof, a first one of said channels being in communication with the interior of the hollow body meter and serving as a static pressure manifold in which sample air is accumulated, a second one of said channels serving as a measurement path in which the mass of sample air is measured as it travels therethrough, and a third one of said channels serving as a collection chamber in which the air exiting from the measurement path is accumulated before being recombined with the main flow of air traveling through said meter.

2. An improved mass air flow meter as claimed in claim 1 in which the middle land is so formed that said measurement path is annular and substantially cylindrical over its length.

3. An improved mass air flow meter as claimed in claim 1 in which the middle land is so formed that said measurement path is annular and substantially helical over its length.

4. An improved mass air flow meter as claimed in claim 1 in which the middle land is so formed that said measurement path is substantially straight over its length.

5. An improved mass air flow meter as claimed in claim 1 in which the venturi member is formed with a nozzle type entrance end which, with the inside wall of the hollow body, causes a severely abrupt change of direction of incoming air to occur at the annular boundary therebetween.

6. An improved mass air flow meter as claimed in claim 5 in which the first channel is provided with the inlet aperture means extending through the wall thickness of the venturi member at the entrance end thereof.

7. An improved mass air flow meter as claimed in claim 6 in which said inlet aperture means comprises a plurality of circumferentially spaced apart apertures having their axes disposed parallel to the longitudinal axis of the meter.

8. Improvement in a mass air flow meter having an elongated hollow body having a venturi member therein, said venturi member having a venturi formed in the inside surface thereof, said meter having a static pressure chamber, a measurement path and a collection chamber, said improvement comprising channels formed in the outside surface of said venturi member, lands defined by said outside surface which bear against the inside surface of said hollow body, said lands, together with the inside surface of said hollow body, directing sample air to be measured through said channels, around the outside surface of the venturi member and axially thereof, said lands consisting of end lands at opposite ends of the venturi member, respectively, and a middle land therebetween, a first one of said channels disposed in the space between the end land at the entrance end of the venturi member and the middle land, said first channel having inlet aperture means therefor extending through the wall thickness of the venturi member at the upstream end thereof by which sample air enters therein, said first channel serving as a static pressure manifold in which sample air is accumulated, the middle land having a second one of said channels formed therein serving as a measurement path in which the mass of sample air is measured as it travels therethrough, and a third one of said channels disposed in the space between the middle land and the end land at the exit end of the venturi member, the third channel serving as a collection chamber in which the air exiting from the measurement path is accumulated before being recombined with the main flow of air traveling through said meter.

9. An improved mass air flow meter as claimed in claim 8 in which the middle land is so formed that said measurement path is annular and substantially cylindrical over its length.

10. An improved mass air flow meter as claimed in claim 8 in which the middle land is so formed that said measurement path is annular and substantially helical over its length.

11. An improved mass air flow meter as claimed in claim 8 in which the middle land is so formed that said measurement path is substantially straight over its length.

12. An improved mass air flow meter as claimed in claim 8 in which the venturi member is formed with a nozzle type entrance end which, with the inside wall of the hollow body, causes a severely abrupt change of direction of incoming air to occur at the annular boundary therebetween.

13. An improved mass air flow meter as claimed in claim 8 in which the first channel is provided with the inlet aperture means extending through the wall thickness of the venturi member at the entrance end thereof.

14. An improved mass air flow meter as claimed in claim 13 in which said inlet aperture means comprises a plurality of circumferentially spaced apart apertures having their axes disposed parallel to the longitudinal axis of the meter.

* * * * *